Aug. 15, 1961    H. C. MORGAN ET AL    2,996,669
DIGITAL VOLTMETER
Filed March 24, 1958    4 Sheets-Sheet 1

INVENTORS
HARRY C. MORGAN
ALAN GOUDEY
BY
Lyon & Lyon
ATTORNEYS

Aug. 15, 1961 H. C. MORGAN ET AL 2,996,669
DIGITAL VOLTMETER
Filed March 24, 1958 4 Sheets-Sheet 2

INVENTORS
HARRY C. MORGAN
ALAN G. OUDEY
BY
Lyon & Lyon
ATTORNEYS

United States Patent Office 2,996,669
Patented Aug. 15, 1961

2,996,669
DIGITAL VOLTMETER
Harry C. Morgan, Sherman Oaks, and Alan Goudey, Woodland Hills, Calif., assignors to Cohu Electronics, Inc., San Diego, Calif., a corporation of Delaware
Filed Mar. 24, 1958, Ser. No. 723,529
5 Claims. (Cl. 324—99)

This invention relates to electronic voltmeters and, more particularly, to improvements in digital electronic voltmeters.

In order to increase the sensitivity and accuracy for measuring voltages, electronic circuits of different types have been devised essentially consisting of bridge arrangements which include a meter for measuring the bridge unbalance voltage. In the course of making a voltage measurement, if oftentimes becomes necessary to rapidly read values of voltages being measured. While a great deal of work has been done on making meter-face calibrations as simple to read as possible, still a direct numerical presentation of the value of the voltage being measured provides a much easier, more accurate, and more rapid indication of the voltage being measured. Such presentations are termed digital presentations, and a voltmeter making such a presentation is known as a digital voltmeter.

An object of this invention is to provide a novel and useful digital voltmeter.

A further object of this invention is to provide a digital voltmeter which is extremely accurate.

Yet another object of the present invention is to provide a digital voltmeter which is extremely rapid in operation.

These and other objects of the invention are achieved by providing an arrangement wherein the voltage to be measured is applied to a first and second terminal of a bridge network having four terminals. A reference voltage source is connected between a first and fourth of these bridge terminals, and a range-adjusting potentiometer is connected between the second and third of the bridge terminals. Means are provided for successively enabling different current increments to flow between the fourth and third of the bridge terminals. This is achieved by successively connecting a different one of a plurality of resistors between the third and fourth terminals. Each time one of these resistors is connected between the terminals, a circuit is operated to detect the polarity of the voltage which exists between the first and third of the bridge terminals. Should the polarity of this voltage be such as to indicate an overbalancing of the unknown voltage, the last resistor connected across the third and fourth terminals is removed, equivalent to removing the last increment of current. The next resistor, which has a value such as to enable a still smaller increment of current to flow between the bridge terminals, is then connected, and the polarity-detecting operation is repeated. In this manner, a range of different valued resistors or current increments is run through for the purpose of balancing the bridge. Each time an overbalance is detected, the resistor causing that overbalance is removed. Means are provided for indicating a digital value corresponding to the resistors which are left connected between the third and fourth terminals of the bridge. This digital value also represents the value of the voltage which is applied to the input terminals of the bridge.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
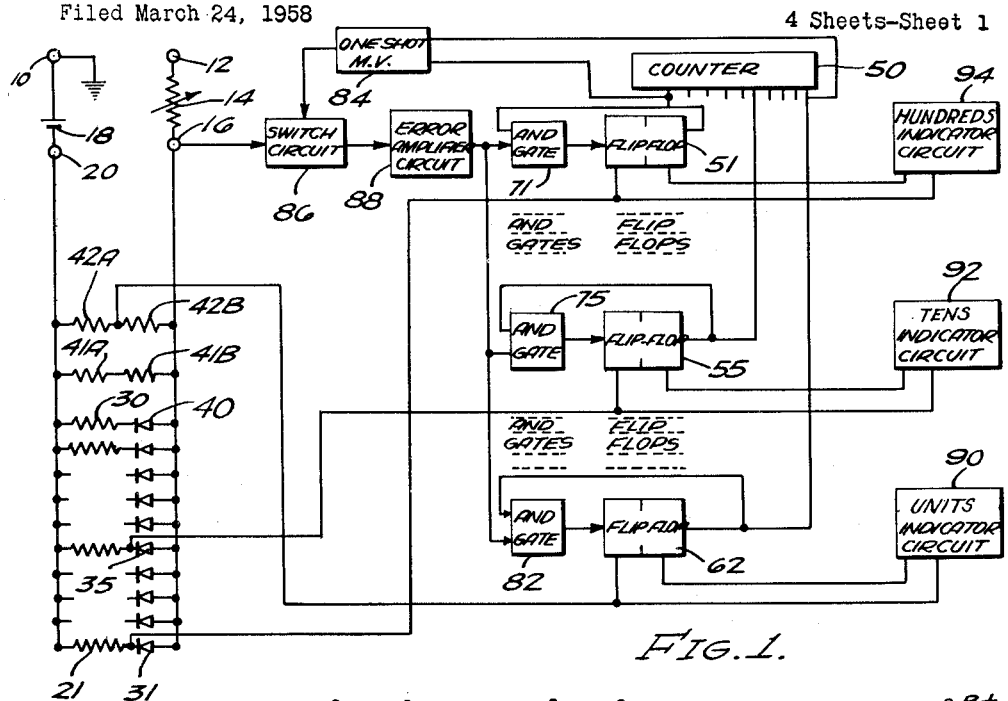
FIGURE 1 is a block schematic drawing of the embodiment of the invention.

Reference is now made to FIGURE 1, which is a block schematic diagram of an embodiment of this invention. Effectively, the digital voltmeter will comprise a four-terminal bridge circuit with two of the terminals 10, 12 serving as the input for an unknown voltage $E_x$. A range-setting potentiometer 14 is connected between the terminal 12 and a third of the bridge terminals 16. A source of standard voltage, represented by the battery 18, is connected between the terminal 10 and a fourth bridge terminal 20.

A plurality of resistors 21 through 30 have one of their ends connected to the terminal 20. The other of their ends are coupled through diodes 31 through 40 to the terminal 16. In addition to resistors 21 through 30, there are still two further tapped resistors, respectively designated as 41A, 41B and 42A, 42,B, which are connected across terminals 16 and 20. The details of the connections of these resistors to other circuitry to provide what is termed a standard bit-current generator is shown and described in FIGURE 4 of the drawings.

In the quiescent condition, each one of the diodes 31 through 40 is biased off so that effectively the resistors 21 through 30 are disconnected. The bias is successively removed from the diodes 31 through 40, so that current can flow through the resistors 21 through 30. The values of the resistors are chosen so that the largest current is enabled to flow between terminals 20 and 16 of the bridge first. Resistors 41A, 41B, 42A, 42B have potentials applied thereto to add the smallest of the current bits to current previously enabled to flow between terminals 20 and 16 of the bridge. The circuit arrangement to be subsequently described herein tests the polarity of the voltage existing between the terminals 10 and 16 each time one of the diodes has its blocking bias removed. If the increment of current, which is thus enabled to flow, is too great and the bridge is overbalanced, this is indicated by the polarity of the voltage detected. The blocking bias is then applied again to the diode, which thereby removes the overbalanced conditions of the bridge. However, the operation of the arrangement is such that successively smaller bits of current are introduced so that after one ranging operation, the bridge will be balanced. An indicator is actuated in response to the number of resistors left connected in the circuit, and the value indicated represents the value of the voltage $E_x$.

To effectuate the operation just described, a counter 50 is employed, which in the embodiment of the invention which has been constructed, can count through a 12-count cycle repetitively, once its operation was initiated. The output of the counter accordingly consists of 12 pulses, or count manifestations. Each output of the counter is applied to set a different flip-flop circuit 51 through 62. Each output of the counter is also applied to prime a different AND gate 71 through 82. Each output of the counter is also applied to trip a one-shot multivibrator 84.

Each one of the flip-flops 51 through 60, when set, removes a blocking bias from each one of the diodes 31 through 40, associated therewith. Thus, as the count of the counter progresses, the flip-flops successively enable connection of resistors 21 through 30 between terminals 20 and 16 of the bridge. Resistors 41A, 41B, and 42A, 42B have a voltage applied to their junctions from the associated flip-flops 61, 62, when these flip-flops attain their set condition.

Each time one of the flip-flops 51 through 62 is set, the one-shot multivibrator 84 is driven simultaneously therewith to apply an output to a switch circuit 86. This switch circuit is connected to the bridge terminal 16 for the purpose of grounding that bridge terminal or connecting it to a point of reference potential, each time an output is received from the one-shot multivibrator 84. As a result of such operation, either a positive or a negative potential is derived. Either of these potentials indicates an unbalance. However, since the bridge is being balanced from only one side of the reference potential, the fact of the occurrence of a potential having a polarity other than the side from which balance is being attempted indicates an overbalance of the bridge. Accordingly, the error-amplifier circuit 88 is made sensitive to only this overbalance-indicating voltage. Expressed alternatively, the error-amplifier circuit responds to voltage of one polarity and not of the other.

The output of the error-amplifier circuit 88 is applied to all the AND gates 71 through 82 simultaneously. The operation of the system is made such that error-amplifier-circuit output will occur during the interval of occurrence of the counter output which initiated the polarity-detecting operation. Accordingly, with both counter output and error-amplifier-circuit output present at the input of the AND gate, the output of the respective AND gates 71 through 82 can reset the flip-flops 51 through 62. As a result, should the unbiasing of a diode and the connection of the associated resistor into the bridge circuit overbalance the bridge, the polarity-detecting circuit functions to apply again a blocking bias to the diode to thereby remove from the bridge circuit the resistor which had just been connected in.

From the description thus far, it will be apparent that the resistors which remain connected into the bridge circuit at the end of one ranging operation will also have the flip-flops associated therewith in their set condition. The outputs of all the flip-flops are applied to three indicators 90, 92, 94, respectively designated as units, tens, and hundreds indicator circuits. These indicators will provide a digital display corresponding to the number of resistors left connected to the bridge circuit and/or the number of associated flip-flops remaining in their set condition. The value displayed will be the amplitude of the unknown voltage $E_x$, which was applied to the bridge. The range potentiometer 14 is employed for extending the voltage-measuring range of the bridge. It operates in well-known manner to provide a one, ten, hundred, or one-thousand multiplication factor for whatever value is indicated by the digital indicators 90, 92, 94.

Figure 2:
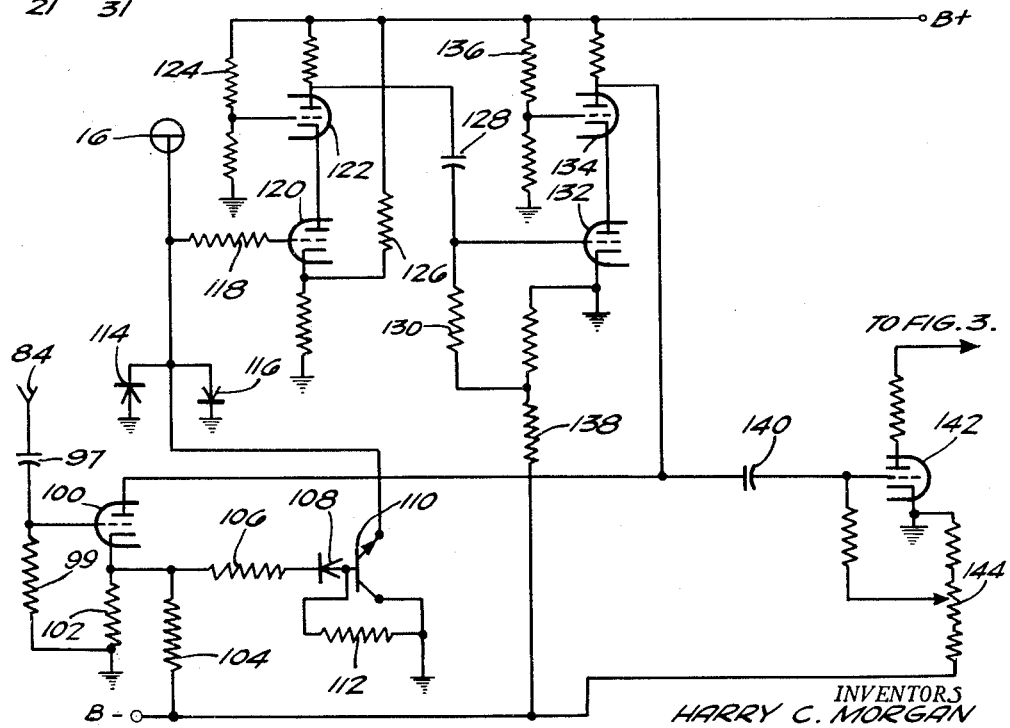
FIGURE 2 is a circuit diagram of a switching circuit and error amplifier employed in the embodiment of the invention.

Reference is now made to FIGURE 2, which is a circuit diagram of the switch circuit 86 and the error-amplifier circuit 88, which are employed in the embodiment of the invention. The output of the one-shot multivibrator 84 is applied to the grid of a tube 100. This tube has a resistor 102 connecting its grid to ground. A second resistor 104 connects its cathode to a source of negative potential. A third resistor 106 connects its cathode to the cathode of a diode 108. The anode of the diode 108 is connected to the base terminal of a PNP transistor 110. The collector terminal of the transistor 110 is connected to ground. The base terminal of the transistor 110 is connected through a resistor 112 to ground. The emitter of the transistor 110 is connected to the terminal 16 of the bridge. Terminal 16 is also connected by a pair of oppositely poled silicon diodes 114, 116 to ground. These silicon diodes have the property that they are substantially nonconductive until the voltage applied exceeds a certain value, which here is on the order of one volt. Therefore, the circuitry of the bridge is protected, since the effective value of the voltage applied to the circuitry cannot exceed one volt. The above-described circuitry comprises the switch circuit 86.

In the absence of an input to the tube 100, the tube is conducting and a positive potential is applied to the junction of resistors 102, 104, 106, whereby the diode 108 has a positive potential applied to its cathode and is essentially biased off or nonconducting. This allows the base of transistor 110 to be at the same potential as ground. At or near a null bridge-state, bridge terminal 16 is near ground potential also. Therefore transistor 110 presents a very high resistance between bridge terminal 16 and ground. Effectively, therefore, the transistor circuit is decoupled from the terminal 16. One-shot multivibrator 84 applies a positive pulse to tube 100 through a differentiating circuit including condenser 97 and resistor 99. The delayed negative edge of the differentiated pulse renders tube 100 momentarily nonconductive, whereby its cathode becomes negative. This applies a negative potential to the cathode of the diode 108, resulting in its becoming conductive and enabling the base of the transistor 110 to be made negative with respect to ground. Resistor 112 is used to allow the base of the transistor to have a low resistance to ground when diode 108 is not conducting. This effectively connects the terminal 16 to ground potential via the saturation resistance of the PNP transistor 110. It at that time terminal 16 has a positive potential, then when it is connected to ground a negative-going pulse is generated, which is applied to the amplifier which follows. Should terminal 16 have a negative potential at the instant of its being grounded, then a positive-going pulse is generated and applied to the amplifier which follows.

The amplifier 88 includes a tube 120 which is cascode connected to a tube 122. It should be noted that the tube 122 is biased to be conducting by means of the connections to resistors 124 and 125 connected in series across the operating potential source. Tube 120 is biased to be in its linear operating range without positive grid current by reason of the positive voltage being applied from the operating potential source through resistor 126 to its cathode.

In the presence of a positive-going pulse, tube 120 is enabled to increase conduction whereby a negative pulse is obtained at the plate of tube 122. This is differentiated by the circuit including the condenser 128 and resistor 130, which couples the plate of tube 122 to the grid of the tube 132. This tube is also cascode connected to a tube 134. Tube 134 is also biased to be in a conducting condition by means of a positive potential applied to its grid which is derived from the resistor 136, which is connected across the source of operating potential. Tube 132 has its grid biased so that it is conductive but not to the positive grid current condition. As a result, it and tube 134 are in a conductive state.

A negative pulse received from the plate of tube 122 will then result in a rise in potential at the plate of tube 134, which is applied through a condenser 140 to the grid of a tube 142. The plate of tube 100 is also connected through the condenser 140 to the grid of tube 142. It should be noted that the grid of tube 142 is connected to a potentiometer 144 for the purpose of establishing the potential at which tube 142 will become conductive. This potential is established at a value which requires both an output from tube 100, as well as tube 134, to be present to render tube 142 conductive. Thus, false triggering of tube 142 is prevented, as for example by the presence of an output from tube 100 alone or from tube 134 alone. Should a negative-going potential be applied to the grid of tube 120, the biasing arrangement which has been described for the two stages of the cascode amplifier combined with their inherent gain is such that no significant output will be derived, which cannot be ignored by the setting of potentiometer 144. The negative output of tube 142 therefore indicates the fact that the bridge has been overbalanced when the last current bit was added.

Figure 3:
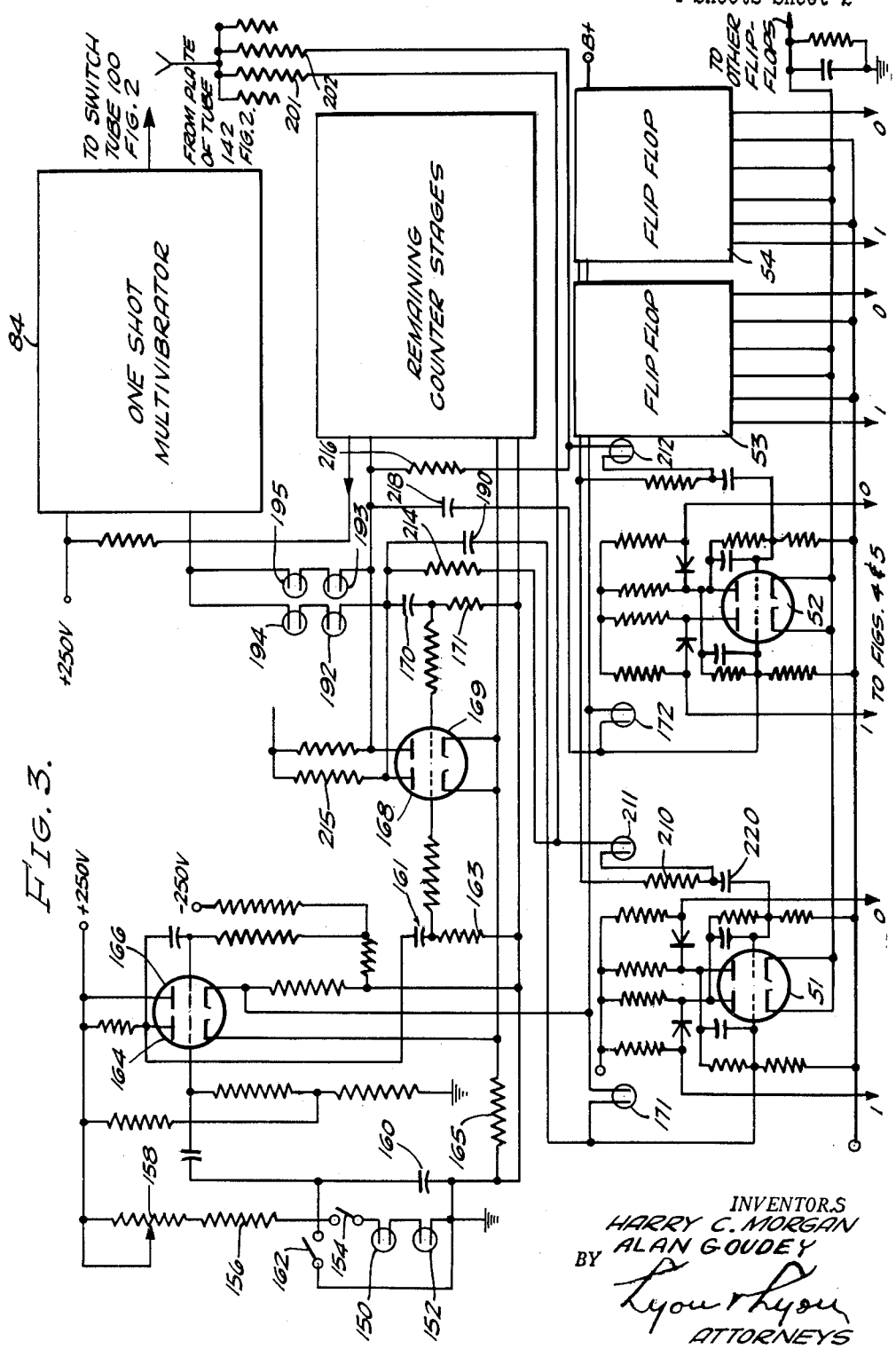
FIGURE 3 is a circuit diagram illustrating one arrangement for counter and flip-flop circuits employed in the embodiment of the invention.

Reference is now made to FIGURE 3, which is a circuit diagram of the first two stages of the counter and the flip-flops and associated AND gates. As previously indicated, by way of illustration but not as a limitation, the counter constructed for the embodiment of the invention contained 12 counter stages. The counter was initiated by a negative pulse which would cause it to cycle through its complete count and then stop until the next pulse is applied thereto. The initiating pulse is here derived from a simple sawtooth oscillator which may be of the type shown in FIGURE 3 comprising a first and second neon tube 150, 152, respectively, which are connected in series to obtain a larger negative pulse. One plate of the neon tube 152 is connected to ground; one plate of the neon tube 150 is connected to one terminal of the switch 154. The other terminal of the switch 154 connects through a fixed resistor 156 and an adjustable potentiometer 158 to a source of operating potential. A condenser 160 is connected across the neon tubes 150, 152, and the switch 154. A second switch 162 is connected between switch 154 and ground. The potentiometer 158 and resistor 156 establishes the frequency of operation of the sawtooth oscillator circuit by determining the time required for condenser 160 to charge up to a value at which neons 150, 152 can become conductive. With switch 154 closed and switch 162 open, the sawtooth oscillator applies negative pulses periodically to the grid of a tube 164. When switch 154 is open, the counter that follows will not operate. With switch 154 open, the counter may have a simple count cycle initiated manually by closing switch 162. Closing switch 154 and leaving switch 162 open enables the counter to be cycled repetitively, since the frequency of the sawtooth oscillator is adjusted by limiting resistor 156 to supply a pulse to the counter at intervals which allow the counter to complete a cycle.

The input to the counter includes two tubes 164, 166; a negative pulse applied to the grid of tube 164 is inverted and amplified and applied to the grid of the first counter stage 168. It is also applied to the grid of tube 166, which is connected as a cathode-follower tube. The cathode of tube 166 provides a positive output which serves to reset all the flip-flop circuits 51 through 62 by means of a reset bus, which is connected to the grid of one of the tubes of each flip-flop circuit 51 through 60 by means of respective neon tubes 171, 172, etc. A positive pulse is applied to the respective flip-flop grids through these neon tubes to reset the respective flip-flop circuits.

Tube 164 has its cathode connected to a cathode load resistor 165. It should be noted that all the cathodes of the counter tubes are connected to this common load resistor. Since tube 164 is biased to be conducting in its standby state, its cathode biases off all the counter tubes. When tube 164 has a negative-going pulse applied to its grid, effectively its cathode is driven to ground potential thus enabling the counter tubes to become conductive, upon a positive pulse being applied to their grids. The output of tube 164 is applied to tube 168 grid by means of condenser 161 and resistor 163, thereby rendering tube 168 conductive. The output of tube 168, which is a negative-going pulse, is applied through a condenser 190 to the grid of flip-flop 51 to drive it to its set condition. It should be noted here that each one of the flip-flops employed are the well-known two-tube bistable state type, wherein in response to an input to one or the other of their grids these tubes can be driven from a set to a reset stable condition. In the operation in accordance with this invention, one grid of the two tubes of the flip-flop circuit is reset by the application of a positive pulse thereto from the neon tubes 171, 172, etc., and the flip-flop circuit is thereafter set in response to a negative pulse which is applied to the same grid. An alternative arrangement for setting the first flip-flop 51, is to use the reset tube 166 to set the first flip-flop only. Thereafter the first counting stage may reset it if the bridge is unbalanced after test. This may be accomplished by connecting neon 171 to the right hand grid of flip-flop 51 instead of the left hand grid and omitting condenser 190.

Flip-flop 51 has now been set by an output from the first counting tube. The first counting-tube output is also applied through two isolating neon tubes 192, 194, which are connected in series, to drive a one-shot multivibrator 84. The one-shot multivibrator circuit is well known to those skilled in the art and comprises an arrangement similar to the flip-flops which has one stable condition and one stable condition. The one-shot multivibrator is driven from its stable to its unstable condition repetitively by the outputs of the respective counter tubes. The one-shot multivibrator returns to its stable condition from its unstable condition after an interval determined by the values of the components of which it is constructed. The differentiated output of the one-shot multivibrator is applied to the grid of the switch tube 10, which is shown in FIGURE 2.

As described previously, the output of the one-shot multivibrator 84 initiates the test of the polarity of the voltage between terminals 10 and 16 to determine whether or not an overbalance of the bridge has occurred. If this is indicated, then the output from the error amplifier as shown in FIGURE 2 is applied to each one of a plurality of resistors 201, 202, etc. (shown in FIGURE 3). There are 12 of these resistors, one for each one of the flip-flop circuits. Two of these are shown 201, 202, representative of the entire 12. Each one of these resistors is connected to a separate neon-glow tube 211, 212. There is one of these glow tubes provided for each one of the flip-flop circuits. Each one of the stages of the counter also has its plate connected to one of these neons 211, 212. For example, the plate of tube 168, the first stage of the counter, is connected through a resistor 214 to one electrode of a neon 211. The plate of tube 169, the second counter stage, is connected through a resistor 216 to the neon tube 212.

Considering neon 211, its other electrode is connected to a source of operating potential through a resistor 210. Its other electrode is also connected through a condenser 220 to flip-flop 51 reset grid. Effectively, resistor 201 and resistor 214 are connected in series with one another, and neon 211 is connected between the junction of these two resistors and through a resistor 210 to a positive source of operating potential. The values of the respective resistors are selected so that when the counter tube 168 only is rendered conductive, the drop in potential is not sufficient to cause neon 211 to ionize. The plate of tube 142 is connected to B+ through a plurality of resistors, including resistor 201, resistor 214, and resistor 215, which is the plate-load resistor of the first counter stage 168. When the tube 142 only is conductive, it draws current through the resistor 214 and the load resistor 215 of the counter tube 168. This too is not sufficient to cause neon 211 to ionize. It is only when both tubes 168 and 142 are conductive that the potential across the neon tube 211 will drop low enough to cause the neon tube to ionize, whereupon a negative pulse is applied through condenser 220 to the flip-flop 51 to reset it.

From this description, it will be appreciated that the neon 211 effectively operates as the AND gate 71, represented by the rectangle of FIGURE 1 and will ionize only in the presence of the counter stage output and output from the error amplifier. The output of tube 168 is applied by means of the condenser 170 and resistor 171 to the tube 169. Since the lower plate of condenser 170 becomes positive with respect to the common cathode line, tube 169 will conduct. This effectively terminates conduction in tube 168 via the common cathode coupling. The plate of tube 169 applies its negative output pulse through the two isolating diodes 193, 195 to the one-shot multivibrator 84. The output of tube 169 is also applied through a condenser 218 to set flip-flop 52. Thereafter, if the polarity test indicates that the bridge is not overbalanced, flip-flop 52 will remain set. If the polarity test indicates overbalance, then the error amplifier will apply an output to tube 142 (shown in FIGURE 2), whereby that tube will draw current through resistor 202 and through resistor 216 and the plate-load resistor of tube 169, increasing the potential across neon 212 to the point where it ionizes and can reset flip-flop 52.

From what has been described, it should be apparent how the counter advances through a count of 12, supplying an output pulse for each count, which first sets a flip-flop, then initiates a polarity test, as a result of which the flip-flop will either remain set or will be reset. At the end of the 12 counts, the counter is in condition for a new cycle of operations. It commences this cycle as soon as another sawtooth pulse is applied to its input. The speed of the sawtooth and the speed of the counter is arranged so that the counter completes a complete cycle in the interval between sawtooth pulses. There is provided a flip-flop circuit for each counter stage and therefore a total of 12 flip-flop circuits. These are arranged in three groups of four, with the first group of four representing voltages which are in the hundreds range, the second group of four representing voltages which are in the tens range, and the third group of four representing voltages which are in the units range. Of course, the multiplier for these values is provided by the potentiometer 14, shown in FIGURE 1.

Figure 4:
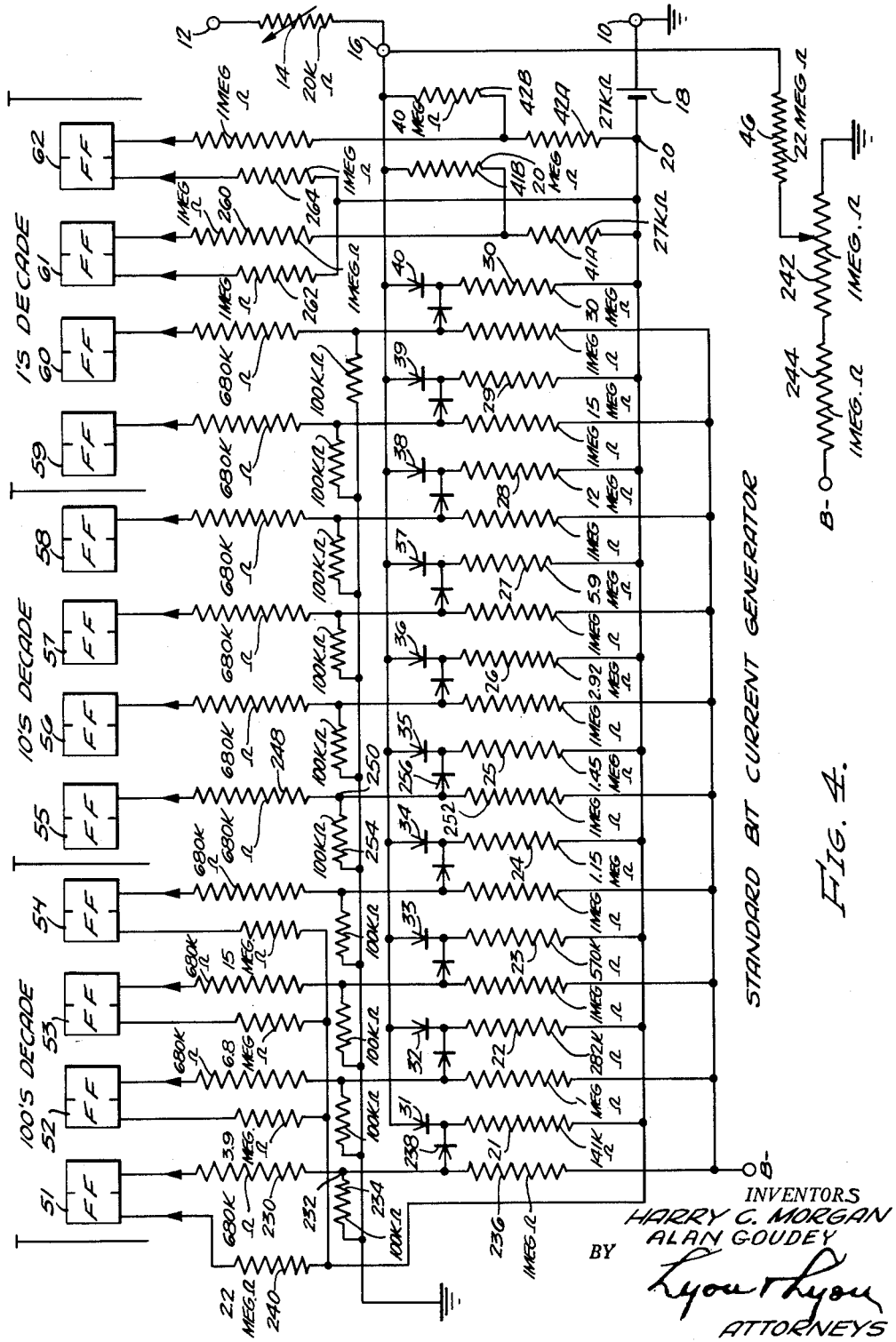
FIGURE 4 is a circuit diagram showing a bit-current generator used in the embodiment of the invention.

Reference is now made to FIGURE 4, which is a circuit diagram of the bit-current generator. These current bits are successively applied to the bridge in response to the operation of the flip-flop circuits. In order to facilitate the explanation of the circuit shown in FIGURE 4, the 12 flip-flops 51 through 62 are again reproduced in this drawing. Considering first the four flip-flops 51 through 54, which control the connection into the bridge of resistors 21 through 24 by controlling the bias applied to the diodes 31 through 34, a description of the connections of the flip-flop 51 to the associated resistor 21 and diode 31 is typical of the connections between the remaining flip-flops 52, 53, 54, and their associated resistors and diodes. Accordingly, only this explanation need be given.

The one, or set, output of flip-flops 51 is connected through a resistor 230 to a junction 232. A second resistor 234 is connected between this junction and ground, and a diode 238 is connected between this junction and the junction between the diode 31 and the resistor 21. When the flip-flop 51 is in its reset condition, its one output is positive, and a positive potential with respect to ground will exist at the junction 232. As a result, diode 238 is conductive and applies a positive potential to the junction between the diode 31 and the resistor 21. This positive potential acts as a blocking bias to the diode 31, effectively thereby disconnecting the resistor 21 from the bridge. When the flip-flop 51 is in its set condition and the set side draws current, its one output is negative, whereby a negative potential with respect to ground is made to exist at the junction 232. This effectively blocks the diode 238, whereby the diode 31 is free to conduct. Current from the reference potential source 18 can flow through the diode 31 and the resistor 21.

The values of the resistors 21 through 42 are selected so that different current values are enabled to flow in this leg of the bridge as the counter connects in the various resistors. By way of illustration, but not to be considered as a limitation, the values shown in the drawing are those selected in an embodiment of the invention which was built. These enable currents on the order of 40 microamperes to flow for resistor 21, 20 microamperes to flow for resistor 22, with the value of the current diminishing by one-half until the combination resistors 42A, 42B which, when a potential is applied to their junction, enable a current of .05 microampere to flow. The voltage at the junction 232 varies approximately between +10 volts when flip-flop 51 is set to −10 volts when it is reset. Resistor 234 is so chosen so as to obtain this voltage swing, thus limiting the leakage currents of the back-biased diodes 238 and 31.

In order to make the current drain on the standard voltage source constant, a resistor 240 is connected from one end of the resistor 21 to the reset, or zero, output side of flip-flop 51. Thereby, when flip-flop 51 is set, current to offset the reduced current which flows through diode 31 and resistor 21 is drawn from the reset side of the flip-flop, whereby the total current drawn from the standard voltage supply is maintained at a constant value.

In order to compensate for any leakage or back current which may flow through the diodes 31 through 40 as the result of the presence of back bias, a potentiometer 242 is provided which is connected from ground through a resistor 244 to a source of negative potential and through a resistor 46 to the terminal 16. A potential is applied from the potentiometer to junction 16 to counterbalance any leakage currents which may flow through diodes 31 through 40. This can be considered as a zero adjustment.

Referring now to the four flip-flops 55 through 58, which are assigned to a tens decade, and more specifically considering the flip-flop 55 and its associated resistors, the set side of the flip-flop 55 is connected through a resistor 248 to a junction point 250. This junction point is connected through a resistor 252 to the B− potential source. Junction point 250 is also connected to ground through a resistor 254; junction point 250 is also connected through a diode 256 to the junction between diode 35 and resistor 25. The operation of the arrangement is identical with that described previously. When flip-flop 55 is reset, then junction 250 is at a positive potential, whereby a current will flow through diode 256 and bias off diode 35. When flip-flop 55 is in its set condition, then the junction 250 will be driven negative, thereby cutting off diode 256 from conduction, whereby the branch, including diode 35 and resistor 25 can provide a current bit between terminals 16 and 20. In view of the fact that the values of the resistors 25 through 28 are much larger than resistors 21 through 24, the current drawn from the standard source of potential 18 as a result of connecting these resistors into the circuit is much less, and therefore the drain on the standard potential source does not affect it deleteriously. Accordingly, the additional connections to the set side of the flip-flops 55 through 58 are not necessary.

Considering the flip-flops 59 through 62, which are associated with the units decade, the connections between the flip-flops 59 and 60 and their resistors 29, 30 and diodes 39, 40, respectively, are identical with the description provided for flip-flop 55 and its associated diode 35 and resistor 25. Thus, this description will not be repeated here. Considering now the resistors 41A and 41B, it will be noted that their junction is connected through a resistor 260 to the one, or set, side of flip-flop 61. When the flip-flop is set, the potential at the junction between resistors 41A and 41B is substantially −1 volt, thus enabling a current to flow through resistor 41B, which in an embodiment of the invention was on the order of 0.1 microampere. When flip-flop 61 is reset, then the potential at the junction between the two resistors is on the order of zero volts, whereby no current flows through resistor 41B and no current-bit contribution is made to the balancing of the bridge at its null condition.

Flip-flop 62 and resistors 42A and 42B operate in similar fashion to provide .05 microampere when flip-flop 62 is set and no current when it is reset. It will be seen that the reset sides of flip-flops 61 and 62 are connected through resistors 262 and 264 to terminal 20 of the bridge, to assist in maintaining a constant current drain on the standard voltage source, in the same manner as was described in connection with resistor 240, connected between flip-flop 51 and terminal 20.

It should be appreciated from what has been described that FIGURE 4 is a circuit diagram of a standard-bit current generator, with the diminishing value standard-bit currents being sequentially inserted into the bridge by operation of the counter from the maximum-current value first to the minimum-current value last. Whether or not a current is permitted to flow is determined by a test each time such current is enabled to flow as to whether or not the presence of the added current overbalances the bridge. If it does, the added current flow is removed and the next smaller current is enabled to flow.

Figure 5:
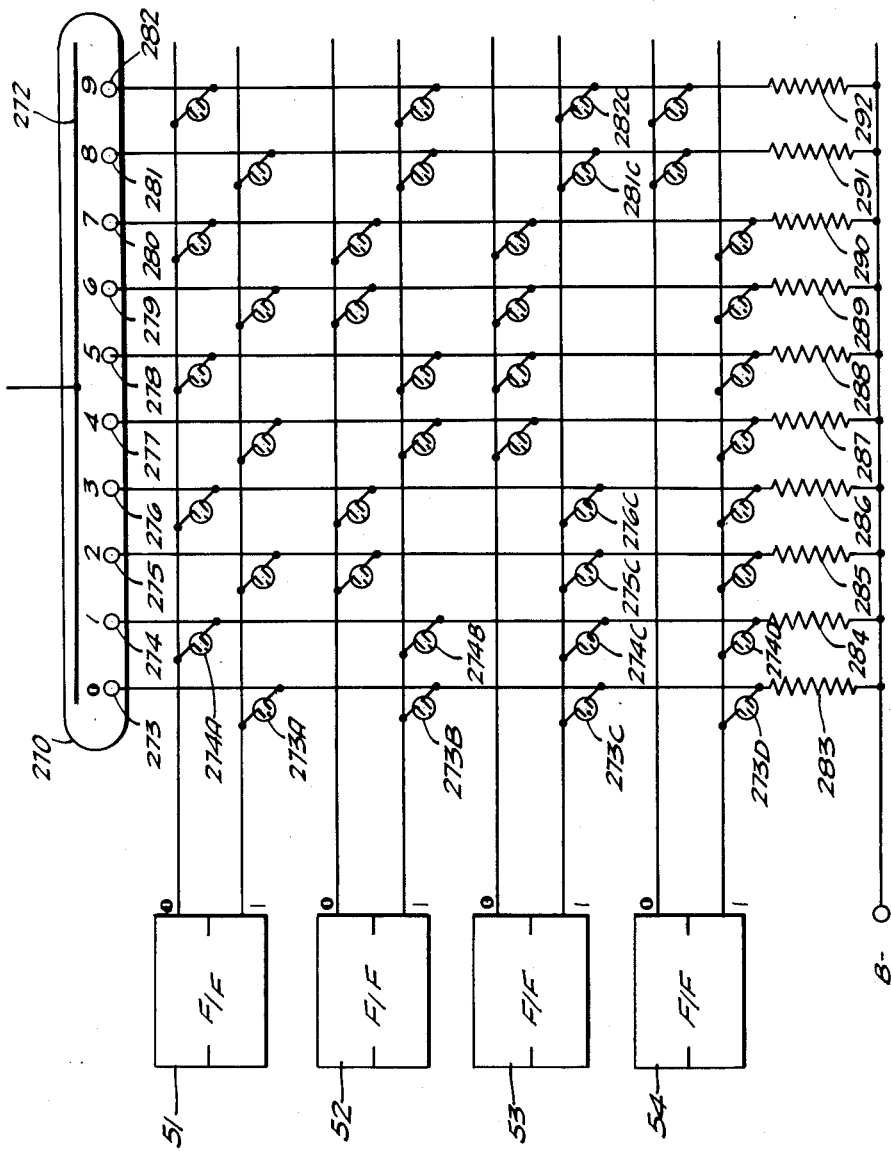
FIGURE 5 is a circuit diagram illustrating the type of indicator which may be employed with the embodiment of the invention.

Reference is now made to FIGURE 5, which shows the circuits employed for the decimal indicator. In the embodiment of the invention being described, there are three decades (hundreds, tens, and units decades), and since each decade is identical, only one of these decades will be described, and it will be understood that such description applies to the others. Accordingly, by way of example, the hundred decade, driven from flip-flops 51 through 54, will be described herein. By way of example and not to serve as a limitation, each decade uses as the actual visual indicator a tube which is sold by the Electronic Tube Division of the Burroughs Corporation under the type number 6844. This tube is commonly called the "nixie." As shown in FIGURE 5, this tube 270 contains in one envelope a single anode 272 and ten cathodes 273 through 282. The most negative one of these cathodes 273 through 282 is the one which will have a glow discharge between it and the anode. These cathodes are in the shape of numbers from 0 through 9, and thus the one which is making an arc with the anode becomes illuminated. Any display is therefore a digital one in the decimal system of arithmetic.

It will be seen that the cathodes 273 through 282 are respectively connected by individual vertical lines respectively to resistors 283 through 292, which are all commonly terminated at a source of B—. Each one of the flip-flops 51, 52, 53, 54 has its set and reset outputs connected to a separate horizontal line. When all flip-flops are reset, indicative of the fact that no current is being contributed by the resistors controlled by these flip-flops, then since the reset or zero outputs are more positive than the set outputs, all the neon glow tubes which are connected between the horizontal lines extending from the reset outputs and to the respective vertical lines are ignited, whereby the vertical lines which are connected to an ignited glow tube are made more positive. It will be seen that none of the neon glow tubes 273A, 273B, 273C, 273D, which are connected between the vertical line connected to zero cathode 273 and the respective set outputs of flip-flops 51 through 54 are ignited at this time. Accordingly, cathode 273 is the most negative of all the cathodes, and an arc between it and the anode will exist and a zero will be illuminated. When flip-flop 51 is set and the remaining flip-flops are reset, then none of the neon glow tubes 274A, 274B, 274C, and 274D are not ignited. However, one or more of the neon glow tubes which are connected to one of the other cathodes is ignited. As a result, the cathode 274, which is the one representing cathode, will cause an arc to exist between it and the anode and a one will be illuminated.

The matrix which connects the flip-flops 51 through 54 to the tube 270 is well known in the computer art as a binary-to-decimal-conversion matrix. It can be readily shown that as the various flip-flops 51 through 54 assume the various possible set and reset combinations, with a decimal weighting of 1, 2, 4, and 8, respectively being assigned to flip-flops 51 through 54 when they are in their set condition, then the sum computed by adding these weighting values for all the flip-flops which are set is the value of the cathode which will be illuminated. Thus, by way of illustration, assuming flip-flops 52 and 53 are set and flip-flops 51 and 54 are reset, the value of the decimal number represented by the set conditions of these two flip-flops is 6. The horizontal line connected to the zero side of flip-flop 51, which is positive at this time, ignites neon glow tubes connecting it to the number 1, 3, 5, 7, and 9 cathode lines. Flip-flop 54, which is reset, has neons connecting its reset output to the numbers 8 and 9 cathode lines. Flip-flop 52, which is set, has its set output connected by neons to the number 0, 1, 4, 5, 8, and 9 cathodes. Flip-flop 53, which is set, has its set output connected to cathode lines 0, 1, 2, 3, 8, and 9 through neon glow tubes. Accordingly, the only cathode line which is not made positive by an ignited neon glow tube will be cathode 279, or the number 6 cathode. Since the neon glow tubes require a certain interval to become ignited, as does the nixie tube 270, even though any of the flip-flops are set initially by the counter, the reset operation, if warranted, occurs so rapidly as to make interim numbers substantially unnoticeable. Thus, the nixie tube will only indicate the value corresponding to the flip-flops remaining set.

There has accordingly been described and shown herein a novel, useful, and accurate digital voltmeter which presents digitally the value of the voltage being measured. It should be appreciated that the actual digital presentation described, while preferred, should not be construed as a limitation upon the invention, since other digital-indicating means may be employed which are operated in response to the set conditions of the flip-flop tubes. Furthermore, although specific values and numbers are indicated for the components of the invention described herein, these are by way of illustration and should not be construed as a limitation upon the invention.

We claim:

1. A digital voltmeter comprising a bridge network having four terminals, means for applying voltages to be measured to a first and second of said terminals, a reference voltage source connected between said first and fourth of said terminals, a range-adjusting resistor connected between said second and a third of said terminals, a plurality of different resistors, each having one end connected to said third terminal, a plurality of different diodes each respectively connected between the other end of a different one of said plurality of resistors and said fourth terminal, a plurality of bistable state flip-flop circuits each of which is associated with a different one of said resistors, means for coupling each one of said flip-flop circuits to the diode connected to its associated resistor to prevent said diode from conducting when said flip-flop is in one stable state and to allow said diode to conduct when said flip-flop is in its other stable state, a counter, means for coupling said flip-flop circuits to said counter to be successively driven to their other stable states by successive counts of said counter, means actuated responsive to said counter attaining a different count to detect the polarity of the voltage between said first and third terminals, means responsive to other than a predetermined polarity being detected by said means to detect for driving to its one stable state the flip-flop circuit just driven to its other stable state, and indicator means for displaying a voltage value representative of the balance voltage, said balance voltage being determined by the number of said flip-flops remaining in their other stable states.

2. A digital voltmeter as recited in claim 1 wherein said means for detecting the polarity of the voltage between said first and third terminals includes a source of operating potential including a point of reference potential, a resistor having one end connected to said point of reference potential, switch means connected between said other end of said resistor and said third terminal, means for biasing said switch open during quiescent intervals, amplifier means coupled to said third terminal, and means for biasing said amplifier means to respond only to signals which have said predetermined polarity.

3. A digital voltmeter as recited in claim 1 wherein said means for detecting the polarity of the voltage between said first and third terminals includes a source of operating potential including a point of reference potential, a transistor having emitter, collector, and base terminals, means connecting said emitter terminal to said third terminal, means connecting said collector terminal to said point of reference potential, a resistor connected between said base terminal and said point of reference potential, amplifier means having its input connected to said third terminal, means for biasing said amplifier means to respond only to signals having said desired polarity, a source of blocking bias, a diode coupling the base of said transistor to said source of blocking bias, means for deriving a pulse for each count of said counter, and means for blocking conduction of said diode in response to one of said derived pulses.

4. A digital voltmeter comprising four terminals, means for applying a voltage to be measured to a first and second of said terminals, a range-setting potentiometer connected between a second and third of said terminals, a reference voltage source connected between a first and fourth of said terminals, a multiple bit-current generator connected between said third and fourth terminals, said multiple bit-current generator including a plurality of diodes, a different resistor connected to each diode to form a junction therebetween, said diodes and resistors being connected between said third and fourth terminals, a first and second resistor connected in series between said third and fourth terminals, a plurality of flip-flop circuits a different one of which is associated with a different one of said diodes and resistors and said first and second resistor, each of said flip-flop circuits having a first and second stable state, a first and second output respectively activated when in the first or second stable state, and a first and second input the application of a pulse to one of which drives a flip-flop to the corresponding stable state, means to couple each of said flip-flop circuits second outputs to a different one of said junctions to bias said diodes to be nonconducting when said flip-flop is in its first stable state and to enable conduction when said flip-flop is in its second stable state, means to couple the respective associated flip-flop circuits respectively to said first and second resistors to prevent current conduction when the associated flip-flop is in its first stable state and to enable current conduction when the associated flip-flop is in its second stable state, a cyclic counter having as many counter stages as there are flip-flop circuits, means to actuate said cyclic counter to derive an output from each one of its counter stages, means to apply the respective counter stage outputs to a different and associated one of said flip-flop circuit second inputs to successively drive said flip-flops to their second stable state, normally inactive means for sensing the polarity of the voltage between said first and third terminals and providing an output when a predetermined polarity is sensed, means for actuating said normally inactive polarity-sensing means upon the occurrence of each counter-stage output, a different two-input AND gate for each flip-flop circuit, means connecting each AND gate output to the associated flip-flop circuit first input, means connecting each counter-stage output to one of the AND gate inputs which is associated with same flip-flop circuit, means applying said normally inactive polarity-sensing means output to all said AND gate second inputs, binary-to-decimal converter means connected to all said flip-flop circuit second outputs, and decimal digit indicator means actuated in response to output from said binary-to-decimal converter means for indicating the value of the balance voltage established between said first and third terminals.

5. A digital voltmeter as recited in claim 4 wherein said normally inactive means for sensing the polarity of the voltage between said first and third terminals and providing an output when a predetermined polarity is sensed comprises, a source of operating potential including a point of reference potential, a resistor having one end connected to said point of reference potential, a transistor having emitter, collector, and base terminals, means connecting said collector terminal to said point of reference potential, means connecting said base to the other end of said resistor, means connecting said emitter to said third terminal, amplifier means having its input connected to said third terminal, means for applying a blocking bias to said transistor base, and means for biasing said amplifier to be conductive only to input signals of one polarity.

References Cited in the file of this patent

UNITED STATES PATENTS

| | | |
|---|---|---|
| 2,625,822 | Nichols | Jan. 20, 1953 |
| 2,762,038 | Lubkin | Sept. 4, 1956 |
| 2,823,351 | Page | Feb. 11, 1958 |
| 2,836,356 | Forrest | May 27, 1958 |
| 2,920,316 | Cohen | Jan. 5, 1960 |

OTHER REFERENCES

Publication, "A Digital Potentiometer," by Dean and Nettel, pages 66–69 of Electronic Engineering magazine, February 1956.